Oct. 20, 1931.  C. H. COLVIN  1,828,097
AIRCRAFT NAVIGATION LIGHT
Filed Nov. 6, 1923   2 Sheets-Sheet 1
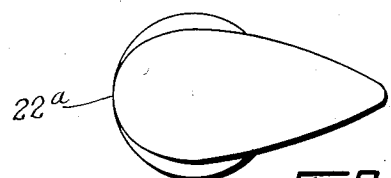
Fig.2.
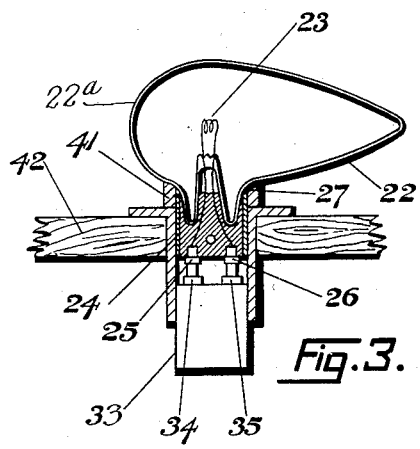
Fig.3.
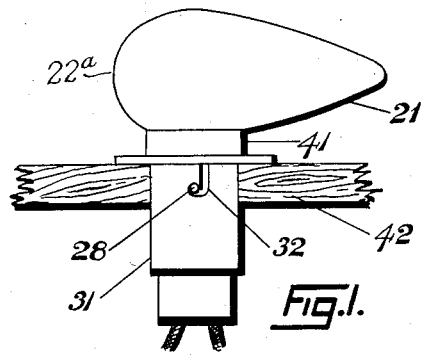
Fig.1.
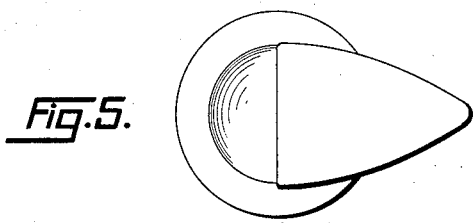
Fig.5.
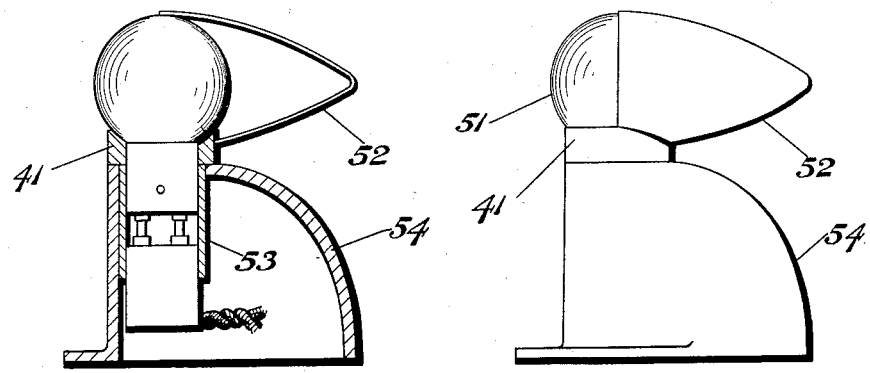
Fig.6.   Fig.4.   INVENTOR
Charles H Colvin Oct. 20, 1931.   C. H. COLVIN   1,828,097
AIRCRAFT NAVIGATION LIGHT
Filed Nov. 6, 1923   2 Sheets-Sheet 2

INVENTOR
Charles H. Colvin

Patented Oct. 20, 1931

1,828,097

UNITED STATES PATENT OFFICE

CHARLES H. COLVIN, OF BROOKLYN, NEW YORK, ASSIGNOR, BY MESNE ASSIGNMENTS, TO PIONEER INSTRUMENT COMPANY, INCORPORATED, OF BROOKLYN, NEW YORK, A CORPORATION OF NEW YORK

AIRCRAFT NAVIGATION LIGHT

Application filed November 6, 1923. Serial No. 673,082.

This invention relates to navigating lights, particularly for use on aircraft.

An object of my invention is to provide a navigation light of light weight and of low resistance to passage through the air, and to streamline the light without the inclusion of extra and cumbersome parts and added weight. Further objects are to provide a light of high visibility and one which may easily be partially shielded to render the light invisible from certain directions. Still further objects and advantages will appear as my invention is hereinafter disclosed.

Referring to the drawings,

Figure 1 is a side elevation of one form of my invention, a fragment of the vehicle upon which the light is mounted being shown in section. The socket is of a flush type.

Figure 2 is a top view of the light shown in Figure 1.

Figure 3 is a sectioned elevation of the light shown in Figure 1.

Figure 4 is a side elevation of my navigation light with an exposed type of socket and an alternate form of bulb.

Figure 5 is a top view of the light shown in Figure 4.

Figure 6 is a partially sectioned elevation of the light shown in Figure 4.

Figure 8:
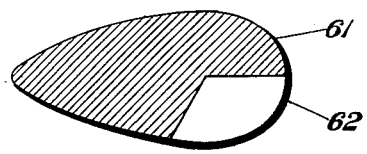
Figure 8 is a top view of the bulb shown in Figure 7.

Referring particularly to Figures 1, 2 and 3, the bulb 21 consists of a shell 22 of glass or other suitable material and of substantially streamline shape, including a front light diffusing lens portion 22a and a rear streamline portion 22, containing a filament 23 and attached to a base 24 which carries contacts 25 and 26 which are connected to the two ends of the filament 23.

The lower portion 27 of the shell 22 is formed into a partially spherical shape. The bulb is mounted in the socket 31 and is retained in the socket by the pins 28 which fit in the bayonet slots 32. Pins 28 and slots 32 also serve to key the bulb and socket in angular relation to each other, and thus hold the streamline bulb-casing 22 in fixed position so as to retain its axis parallel to the direction of travel in order to reduce head resistance.

Compressed between the bulb-shell 22—27 and the socket 31 is a grommet 41 of rubber or other elastic material, for making a substantially water-tight seal between the bulb and the socket. The socket has an insulating base portion 33 which carries two contacts 34 and 35, which engage contacts 25 and 26 of the bulb to carry electric current to the bulb. The socket 31 is mounted on a portion of the vehicle 42. It will be noted that the hemispherical portion and the streamilne portion have a common longitudinal axis, which is perpendicular to the axis of the base, that is, the vertical axis in the drawings.

The streamline shell portion 22 overhangs the base to one side thereof and the front hemispherical shell portion is of course integral therewith and overhangs the base on the other side with the filament rising from the base within this novel shaped bulb shell. By shaping the glass bulb as herein disclosed, there is saved that unnecessary and additional expense and increased size heretofore involved in making metal streamline casing, for in my invention the new glass bulb performs the manifold purposes of reducing the size of the lamp; enclosing the filament; and reducing the air resistance.

Referring particularly to Figures 4, 5 and 6, a bulb 51 of the well-known spherical type, carries an extension 52 of substantially streamline form. This extension may be of celluloid or other transparent or opaque material and may be cemented or otherwise secured to the bulb, and its front end or edge is substantially equal in size or diameter to that of the bulb 51 so these two parts may fit together. In other respects the bulb is substantially as described in the previous paragraph. The bulb is mounted in a socket 53 with a grommet 41 held between the bulb and socket. The socket 53 is carried in a base 54 of substantially streamline form.

Figure 7:
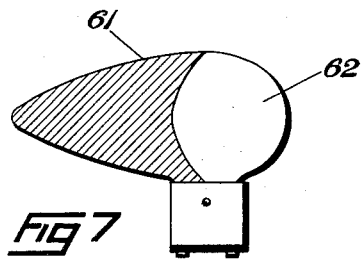
Figure 7 is a side elevation of the type of bulb shown in Figures 1, 2 and 3, with the surface rendered partially opaque as indicated by the shaded area. This is shielded as for use as a right hand (starboard) light.
Figure 9:
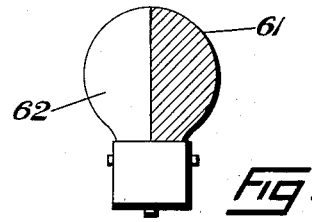
Figure 9 is a front view of the bulb shown in Figure 7.

Referring to Figures 7, 8 and 9, a bulb of the form shown in Figures 1, 2 and 3 is illustrated. The shaded portion 61 is rendered opaque by the application of paint or enamel or the fusing of an opaque color into the glass. A certain portion 62 is left clear, through which the light from the filament may be observed. The navigation light may thus be suited for use in conformity with a code which specifies the angles through which a light must be visible and invisible.

Figure 11:
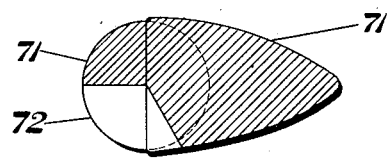
Figure 11 is a top view of the bulb shown in Figure 10.
Figure 12:
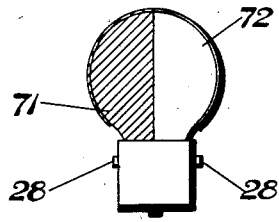
Figure 12 is a front view of the bulb shown in Figure 10.
Figure 10:
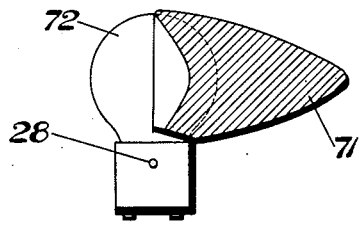
Figure 10 is a side elevation of the type of bulb shown in Figures 4, 5 and 6, with the surface rendered partially opaque as indicated by the shaded area. This is shielded as for use as a left hand (port) light.

Referring to Figures 10, 11, and 12, the shielding of the bulb for the purpose just described is illustrated as applied to the type of bulb shown in Figures 4, 5 and 6. The shaded surface 71 of the glass and of the celluloid is rendered opaque, and the clear surface 72 left transparent.

The pins 28 serve as keys to maintain the angles of the shielded areas in proper relation to the socket in which the bulb is mounted and hence to the vehicle to which the socket is attached, thereby retaining the streamline axis in the proper direction, and furthermore they maintain the contacts in engagement.

The clear portions of the bulb and celluloid may be treated with a transparent coloring material to give, for example, a red or green color to the light for use as a port or starboard light. The desired color may also be obtained by making the bulb of glass of the desired color.

A material advantage exists in coloring the glass bulb to suit laws or customs in vogue because of economy in making the lamps for it is obvious that the lamp is smaller in size and consists of less parts than present-day lamps, the bulb of which is ordinarily enclosed in a metal housing, the housing itself being fitted with colored lenses. One of the features of my invention is to make the bulb perform the office of a housing.

Where it is possible to set the socket into a surface of the vehicle, the form of light shown in Figures 1, 2 and 3 is used, this giving a minimum of resistance to passage through the air, as practically the only exposed area is the bulb and this is of a streamline (minimum resistance) shape.

Where it is impossible to set the socket into a surface of the vehicle, the form of light shown in Figures 4, 5 and 6 is used. This provides the minimum resistance to passage through the air by limiting the exposed area substantially to the bulb and socket mounting, both of which are of streamline shape.

The use of the elastic grommet between the bulb and socket makes it possible to use these lights in the presence of spray or water, without danger of admitting water to the socket and thereby injuring the electrical system. The grommet also serves to cushion and protect the lamp from shock or blows received at the base of the bulb and thus aids the bulb in fulfilling its office as a lamp case or housing.

The principle of my invention lends itself to various forms of design and construction and not only improves the neatness of lamps, reduces the weight and size thereof, and eliminates parts, but economizes in its manufacture.

Having thus disclosed what I now consider preferred forms of my invention, what I claim as new, and desire to protect by Letters Patent, is:—

1. A lamp comprising a base, filament means carried by the base, a bulb carried on the base including a transparent light-emitting portion on one side of the filament and a streamline portion on the other side of the filament, and an anchorage means carried by the base by which the axis of the streamline portion is fixed in a predeterminable direction.

2. A lamp comprising a base, filament means carried by the base, a bulb carried on the base and enclosing said filament means including a light-emitting portion on one side of the filament and an opaque portion on the other side of said filament, said portions having a common longitudinal axis which is perpendicular to the axis of said base, and an anchorage means carried by the base whereby the axis of said portions is adjusted in a predetermined direction.

Signed at Brooklyn, in the county of Kings, and State of New York, this 5th day of November, A. D. 1923.

CHARLES H. COLVIN.